United States Patent [19]

Mathur et al.

[11] Patent Number: 4,816,225

[45] Date of Patent: Mar. 28, 1989

[54] APPARATUS FOR THE PURIFICATION OF CONTAMINATED SULFUR

[75] Inventors: Krishna S. Mathur, Alberta, Canada; Ferdinand Werni, Weinstadt, Fed. Rep. of Germany

[73] Assignee: Santrade Ltd., Luzern, Switzerland

[21] Appl. No.: 18,417

[22] Filed: Feb. 25, 1987

[30] Foreign Application Priority Data

Mar. 4, 1986 [DE] Fed. Rep. of Germany ....... 3606931

[51] Int. Cl.⁴ ............................................. B01D 33/10
[52] U.S. Cl. .................................... 422/262; 422/209; 422/232; 422/233; 422/269; 422/271; 422/273; 423/567 A; 423/578 A; 210/374
[58] Field of Search ................ 422/209, 262, 230-233, 422/271, 273, 269; 423/567 A, 578 A; 210/374

[56] References Cited

U.S. PATENT DOCUMENTS

| | | |
|---|---|---|
| 1,328,210 | 1/1920 | Shires . |
| 1,963,921 | 1/1934 | Nagelvoort . |
| 2,044,214 | 1/1936 | Jones . |
| 2,149,373 | 3/1939 | Vincent et al. . |
| 2,375,499 | 5/1945 | Shigley ................................ 422/233 |
| 2,619,496 | 11/1952 | Stanton ............................... 422/232 |
| 2,731,332 | 1/1956 | Ackert et al. . |
| 2,915,369 | 12/1959 | Oaks et al. . |
| 3,649,217 | 3/1972 | Bailey . |
| 4,172,000 | 10/1979 | Jagodzinski et al. .................. 432/13 |
| 4,203,625 | 5/1980 | Ellithorpe et al. ..................... 299/6 |
| 4,247,240 | 1/1981 | Schora, Jr. et al. ................ 422/232 |
| 4,368,125 | 1/1983 | Murray ............................... 210/374 |

FOREIGN PATENT DOCUMENTS 6314 12/1953 Fed. Rep. of Germany .
957567 8/1956 Fed. Rep. of Germany .
2014613 10/1971 Fed. Rep. of Germany .

OTHER PUBLICATIONS

Article, "Hamilton Tubular Sulphur Melter", G. G. Vincent et al. Canadian Pulp & Paper Assoc., Montreal; 1946 (pp. 129, 130 and 134).

Primary Examiner—Michael S. Marcus
Assistant Examiner—Timothy M. McMahon
Attorney, Agent, or Firm—Burns, Doane, Swecker & Mathis

[57] ABSTRACT

Impurities are removed from pieces of sulfur by dropping the pieces directly into a bath of heated liquid sulfur disposed in a vessel. The liquid sulfur is heated externally of the vessel and conveyed thereto. The sulfur pieces melt in the bath. A movable element, such as a rotary screen drum or conveyor blades for example, is disposed in the bath for agitating the bath and entraining the impurities.

20 Claims, 5 Drawing Sheets

APPARATUS FOR THE PURIFICATION OF CONTAMINATED SULFUR

BACKGROUND OF THE INVENTION

The invention concerns a process and apparatus for the purification of contaminated sulfur.

To remove the sulfur obtained from the refining of petroleum and natural gas in large volumes and stored in large numbers of blocks, it is known (see U.S. Pat. Nos. 4,171,200 and 4,203,625), either (a) to drill holes in the blocks of sulfur and insert heating tubes through which steam is conducted in order to melt off parts of the blocks, or (b) to transform the solid sulfur into the liquid state by means of mobile devices with heating means mounted on them, then remove the sulfur through pipes and reconvert it later into the solid state. These thermal removal processes are used, because removal by mechanical means such as excavators, is not permissible in view of the dust generated in the process.

It is further known in regard to thermal sulfur removal processes (see Hamilton Tubular Sulphur Melter, published by Canadian Pump and Paper Association, Montreal, Meeting of Jan. 24–26, 1946), to transfer the melting heat by direct contact of the raw sulfur with heated surfaces, or to use already molten sulfur as the heat transfer medium. After a certain initial phase, the molten sulfur melts and is collected to flat pans.

It has also been attempted in a similar manner (see Alberta Sulfur Symposium, "Proceedings of Sulfur 84" Sulphur Development of Canada, pgs. 418–420), to purify contaminated sulfur by collecting small broken pieces of sulfur in a vessel with a funnel-shaped bottom. The vessel is equipped with heating devices which are in contact with the sulfur pieces. The melting sulfur is to flow downward and be obtained in the purified state after passing through several coarse and fine filters arranged successively.

Installations of a similar type (see U.S. Pat. No. 2,149,373), comprise a steam-heated, cylindrical pipe for the melting of sulfur pieces, the pipe being placed vertically over a heated funnel and closed on the bottom with an adjustable cone. In the funnel, which has an overflow on top, the molten sulfur is purified. Fine residual impurities are removed at the bottom of the funnel. Installations of this type have the disadvantage that, in contrast to the melting of relatively pure sulfur, they become unusable after a relatively short period of time, because they become coated with sulfur. That is, at least a portion of the impurities separated from the sulphur is deposited on the heating devices or the cone and, depending upon the properties of the sulfur, the sulfur solidifies and bakes thereon. Furthermore, while the water content of the sulfur evaporates in the area of the heating devices, it is recondensed upon rising into the cooler zones of the melting vessel or the cylindrical pipe, so that the water must be evaporated several times.

It is known that sulfur conducts heat very poorly so that contaminated heating devices are no longer able to perform the melting process after a relatively short period of time. This is particularly true if the sulfur is to be removed from the area of the aforementioned storage blocks located in the vicinity of the ground surface or even below it. The proportion of contamination contained in the sulphur is too large to permit the undisturbed operation of such known purification installations for any length of time. It is, therefore, a disadvantage of these installations that they must be cleaned relatively often, during which cleaning operations, the installations must be shut down, so that a continuous purification of sulfur is not possible.

This disadvantage is not characteristic of another known apparatus for the recovery of sulfur from minerals (see German No. OS-20 14 613), in which water is heated in an autoclave under pressure to temperatures above the melting point of sulfur and used to heat the sulfur. The portion of the mineral not containing sulfur is removed by means of a rotating screen for the pressurized water and from the sulfur settling in the pressurized water due to difference in specific gravity. A disadvantage of that process involves the expense of manufacturing and operating the pressurized vessel and obtaining the sulfur from a refining cell provided therein.

It is, therefore, an object of the present invention to provide a process and apparatus of the afore-mentioned type so that even heavily contaminated sulfur may be purified with a high degree of efficiency without incurring excessive costs.

SUMMARY OF THE PREFERRED EMBODIMENTS OF THE INVENTION

To attain this object, a source of heated liquid sulfur is provided to supply a vessel with a bath of heated liquid sulfur. Pieces of contaminated sulfur are dropped directly into the bath, whereupon they melt. By using a sulfur bath to melt the pieces of sulfur, a significantly improved transfer of heat is obtained, which is not burdened by the disadvantage of impurities adhering to or settling on heating devices. The sulfur bath has a depth sufficient to fully accept the sulfur pieces dropping into it and then to melt the sulfur. From this sulfur bath, impurities may be easily removed by means of a mechanically moving body located in the bath.

The moving body may comprise a rotating screen, arranged in the vessel in a manner such that part of its circumference is immersed in the sulfur bath. If the sulfur pieces are moved inside the rotating screen, the liquid sulfur may exit and be conducted to a heating source, while the impurities remain inside the rotating screen and therefore cannot affect the heating devices in the heating source. It is a further advantage to introduce heated liquid sulfur into the vessel, so that it is not necessary to provide heating devices in the vessel itself which will become coated by the sulfur or the impurities. The vessel is placed in a sulfur circulation loop externally of the heating source.

The vessel may be in the form of a rotating, approximately cylindrical drum an inner surface of which defines the moving body for entraining the impurities. The surface carries conveyor blades which agitate the liquid sulfur contained in the bath while moving solid impurities to a location where they may be conveyed away, for example by means of a discharge channel.

BRIEF DESCRIPTION OF THE DRAWINGS

The objects and advantages of the invention will become apparent from the following description of a preferred embodiment thereof in connection with the accompanying drawings, in which like numerals designate like elements, and in which.

DETAILED DESCRIPTION OF PREFERRED EMBODIMENTS OF THE INVENTION

Figure 1:
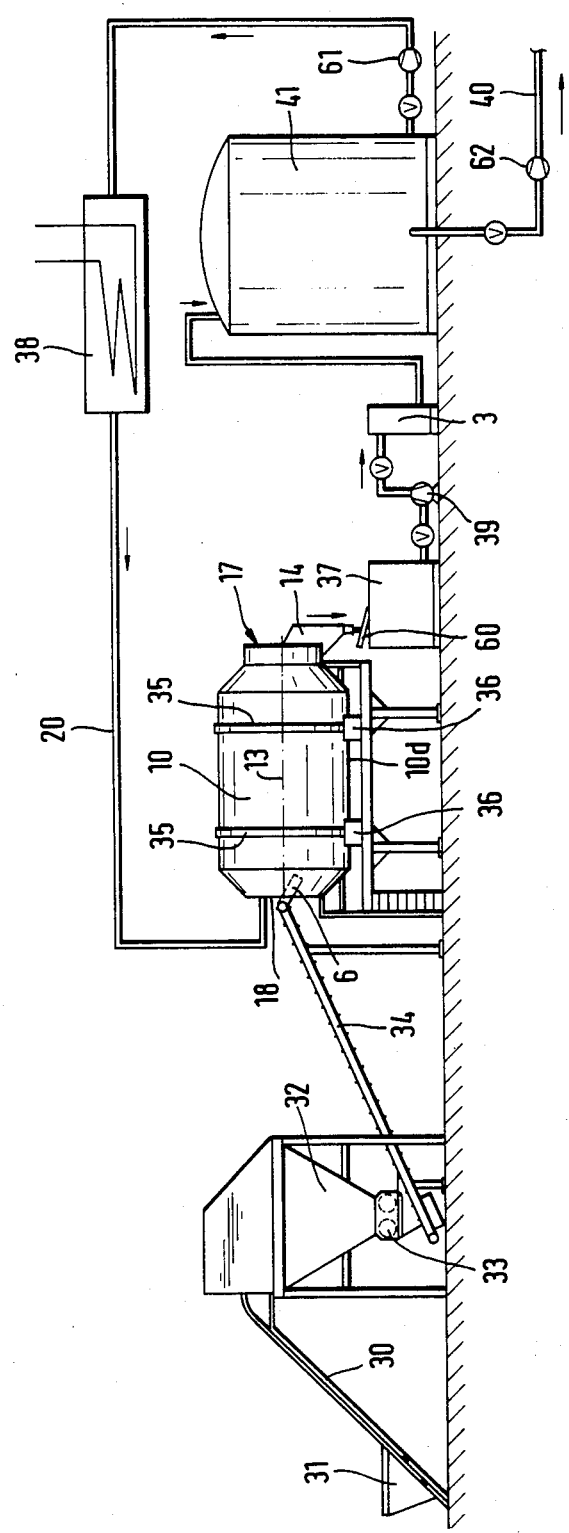
FIG. 1 depicts a schematic view of an overall installation constructed according to the invention for the purification of contaminated sulfur.

FIG. 1 shows an overall installation for the purification of contaminated sulfur in schematic view. From a storage site (not shown), for example from the foot of a storage pile or from an underground area, sulfur is transported in an impure form, contaminated for example by soil or other inclusions, in coarse lumps to a conveyor 30, from which it is placed into a collector funnel 32 by means of a conveyor car 31, with said funnel 32 containing a comminuting apparatus 33 at its lower end. The comminuted sulfur pieces exiting from the lower end of the funnel 32 are subsequently transported by means of a conveyor belt 34 to an inlet end 18 of a vessel in the form of a rotating drum 10 and from there moved over an inclined chute or a conveyor channel 6 into the drum 10 itself. The drum 10 is mounted in a known manner by means of a guide rings 35 rotatingly supported on bearings 36 and is capable of being rotated around its axle 13 by a drive (not shown). The bearings themselves may be supported on a maintenance platform.

As will be explained below in more detail with regards to FIGS. 2 to 5, the sulfur pieces introduced by the conveyor 34 are melted within the rotating drum 10. Coarse impurities are removed mechanically from the melt, and the molten sulfur is moved to the outside over an overflow 14. The molten sulfur passes through a screen 60 (FIG. 1) and arrives in a heated collector tank 37. By means of a pump 39 the sulfur is conveyed through a filter 3 into a heated storage tank 41. Some of the liquid sulfur is required for the melting process and is taken from the storage tank 41 by means of a pump 61 and moved through a heat exchanger 38 in which it is heated to approximately 145° C. The heated liquid sulfur is then transported through a feed line 20 back to the inlet end 18 of the drum vessel 10 and from there into the drum. THe tank 41 and/or the heater 38 thus defines a source of heated liquid sulfur which communicates with the vessel 10 via the conduit 20. The sulfur not needed for the melting process is taken by means of a pump 62 from the storage tank 41 and conveyed through a line 40 either directly into a sulfur solidifying installation or into a heated storage tank.

The core of the installation of FIG. 1 comprises the rotating drum 10 shown in FIGS. 2 to 5, which has an approximately cylindrical configuration, but has in the area of its outlet 10b a conical wall 42, in a manner similar to a mixer drum. The drum 10 rotates around an axle 13, which is slightly inclined relative to the horizontal. The wall 42 forms the outlet end 17 which contains along its lower circumference an overflow opening 14 for the liquid sulfur conveyed through the line 20 into the drum and rising in the lower area of the drum to the height 43 to form a sulfur bath. The overflow 14 is disposed at a level above a bottom of the bath. In particularly, the overflow 14 is disposed above a bottom of a compartment of the vessel which contains the bath. This bath is in constant motion due to the rotation of the drum. On its internal wall 10a, the drum 10 comprises a plurality of conveyor blades 16 increasing in height toward the conical wall 42, as seen by comparing the sectional views of FIGS. 4 and 5, and the sectioned FIG. 2. The conveyor blades 16 entrain impurities and additionally produce, during the rotation of the drum, a stirring motion. The conveyor chute 6 extends into the drum 10 through the opening 18 of the right hand inlet wall 10c. The chute discharges into an area which is located behind a vertically downward portion 20a of the feed line 20. Since the vessel is open at its ends 17, 18, the vessel is non-pressurized.

The line 20 contains a plurality of downwardly projecting openings 21, through which heated liquid sulfur may be continuously supplied to the bath to provide melting energy for melting the sulfur pieces. The heat required for heating the liquid sulfur traveling to the drum is supplied by the heating device 38 which, however, is not located within the drum 10. It may, however, be possible to provide an auxiliary heater (not shown) within the drum to maintain the temperature of the liquid sulfur in a selected temperature range. Since the auxiliary heater does not provide the main energy for heating the liquid sulfur fed in through the line 20 (i.e., the heater 38 supplies the main energy), the auxiliary heater can be so located and/or shielded within the drum as to avoid becoming coated with sulfur or impurities.

The line 20 is equipped along its downward portion 20a with spray nozzles 22, arranged in such manner that the sulfur pieces 2 dropping from the feed chute 6 into the drum are sprayed with heated liquid sulfur and thus are being pre-melted.

Figure 4:
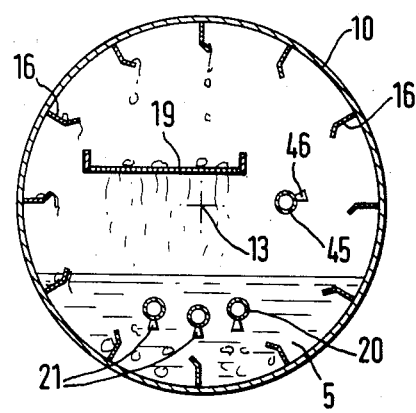
FIG. 4 is a section through FIG. 2 taken along the line IV—IV.
Figure 5:
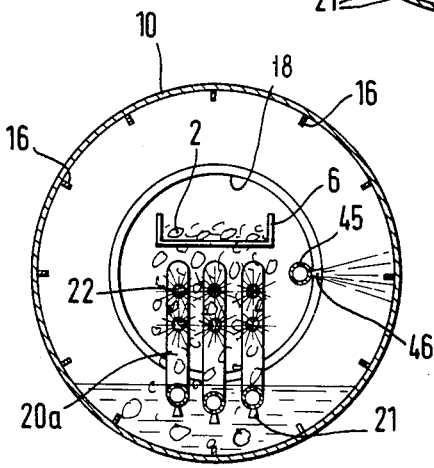
FIG. 5 is a section through FIG. 2 taken along the line V—V.

In the area of the taller parts of the conveyor blades 16, a discharge chute 19 projects through the outlet opening 17. The chute is located and arranged so that the coarse impurities moved upwardly along the wall 10a by the conveyor blades 16 in the course of their rotating motion (as seen in FIG. 4) drop onto the chute 19, from where they move outward, for example into a collector vessel 44.

Pipelines 45 (FIG. 4) branched off the feed line 20 may extend additionally into the drum 10, which lines 45 are equipped with outwardly directed spray nozzles 46. The jets of liquid sulfur emanating from the nozzles 46 continuously clean the downward moving conveyor blades 16, which following their immersion in the sulfur bath 5 are again used to convey the impurities upward into the chute 19.

Figure 6:
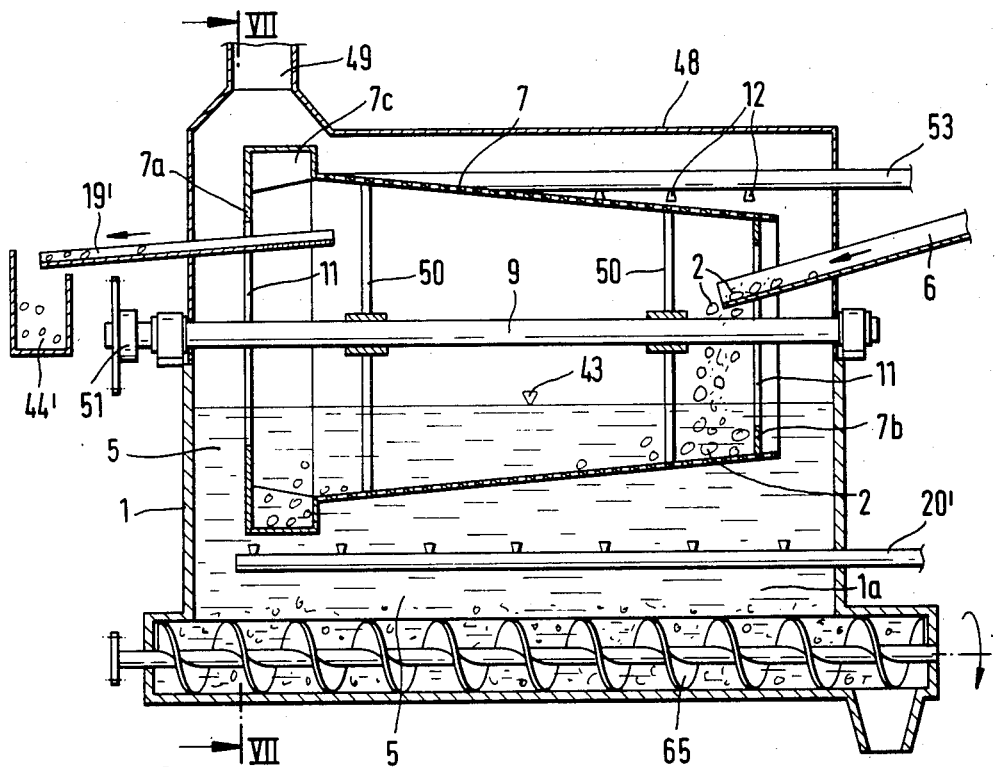
FIG. 6 depicts a second embodiment of the invention in longitudinal section.
Figure 7:
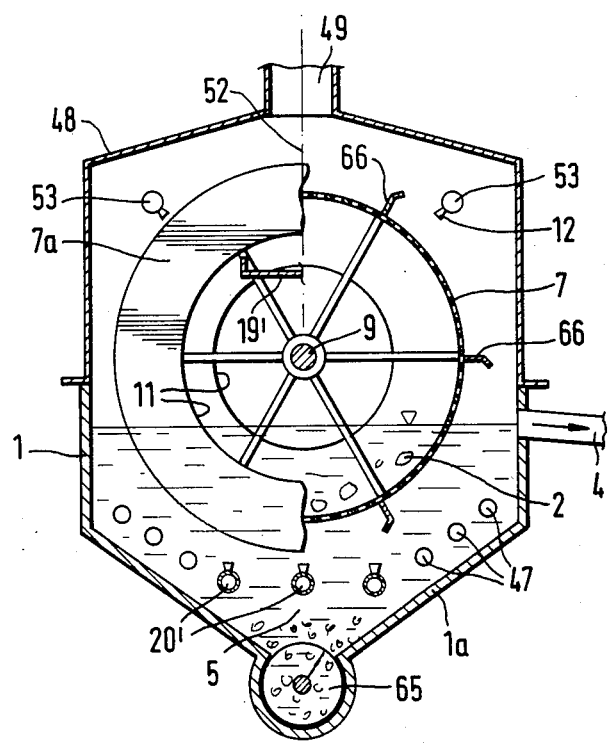
FIG. 7 is a section through FIG. 6 taken along the line VII—VII.

A modified installation depicted in FIGS. 6 and 7 deviates somewhat from the principle of a rotating drum, although one modified installation is equipped with a rotating path. In FIGS. 6 and 7, a stationary vessel 1 is provided for containing a sulfur bath 5, which again is filled to a certain level 43 with liquid sulfur at a temperature of approximately 145° C. This heated sulfur is introduced into the vessel by a feed line 20', which inside the vessel divides into several branches. Additionally, in this case an auxiliary heater in the form of a steam operated heating coil 47 may be provided to maintain the temperature in the sulfur bath 5.

The lower area of the vessel walls comprises inclined bottom parts 1a and is equipped with a connecting conveyor screw housing 65, so that the impurities accumulating in the vessel 1 may be removed easily. An overflow 4 (FIG. 7) is located at the approximate height of the level 43 on the vessel, the overflow being closed on top by a hood 48. The hood 48 includes an exhaust 49 which may be connected with an exhaust fan to remove harmful sulfur vapors. A shaft 9 is supported rotatingly on the vessel 1 on which is mounted a conical drum 7 by means of spokes 50. The drum 7 is formed of screening so as to be porous. In cross-section, the drum may be circular (as shown) or polygonal. The screening drum 7 comprises two end openings 11 having radial annular rims 7a, 7b. The feed chute 6 passes through the right hand opening 11 within the rim 7b, with pieces of sulfur 2 being conveyed by the chute 6 into the screening drum, in a manner similar to the embodiment of FIGS. 1–5. The screening drum is arranged so that at least its lower zone is immersed in the sulfur bath 5. At the location of the largest diameter of the conical drum, a collector channel 7a, is mounted in which the impurities released by the melting sulfur are collecting and are transported upwardly by means of a ladle device or blades 7c. The lifted impurities drop onto a discharge chute 19', from where They travel to the outside into a connector vessel 44'. The screening drum 7 is rotated by a drive 51 so that the impurities melting from the sulfur pieces are entrained by the inner surface of the drum and are moved to the left edge 7a of the drum. Only part of the impurities, dropping through the orifices of the screening drum 7, are therefore accumulating in the conveyor screw housing 65.

Feed lines 53 are provided for heated liquid sulfur in the area above the rotating screening drum 52 and are arranged symmetrically relative to the longitudinal center axis of the vessel 1. The feed lines extend approximately over the length of the screening drum parallel to its axis 9. These feed lines 53 are equipped with spray nozzles 12, from which jets of liquid sulfur are directed toward the inside of the screening drum, whereby impurities that may still be suspended in the orifices of the screen drum 7 are washed back into it. A plurality of blades 66 is mounted on the outside of the screening or polygonal drum, whereby the liquid sulfur in the vessel 1 is agitated, in order to, on the one hand, improve the transfer of heat, and on the other, to prevent the rapid soiling of the heating coils 47.

Figure 2:
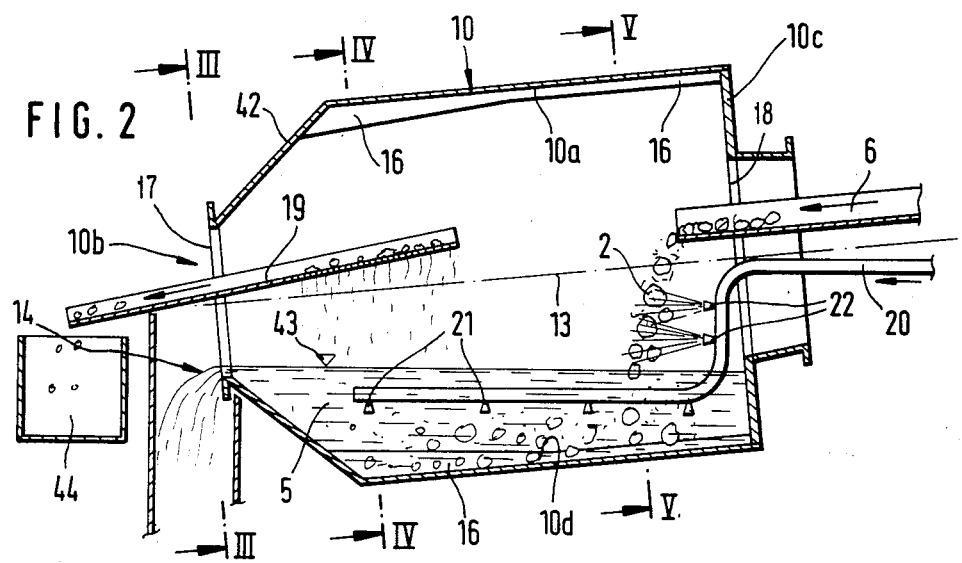
FIG. 2 depicts a first embodiment of the invention in longitudinal section.
Figure 3:
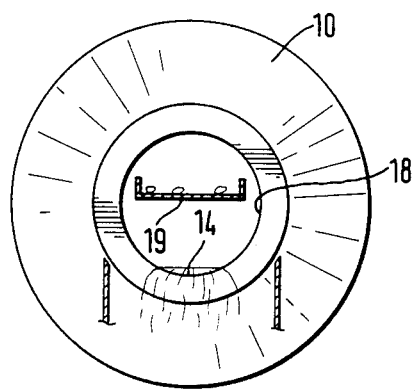
FIG. 3 is a section through FIG. 2 taken along the line III—III.
Figure 8:
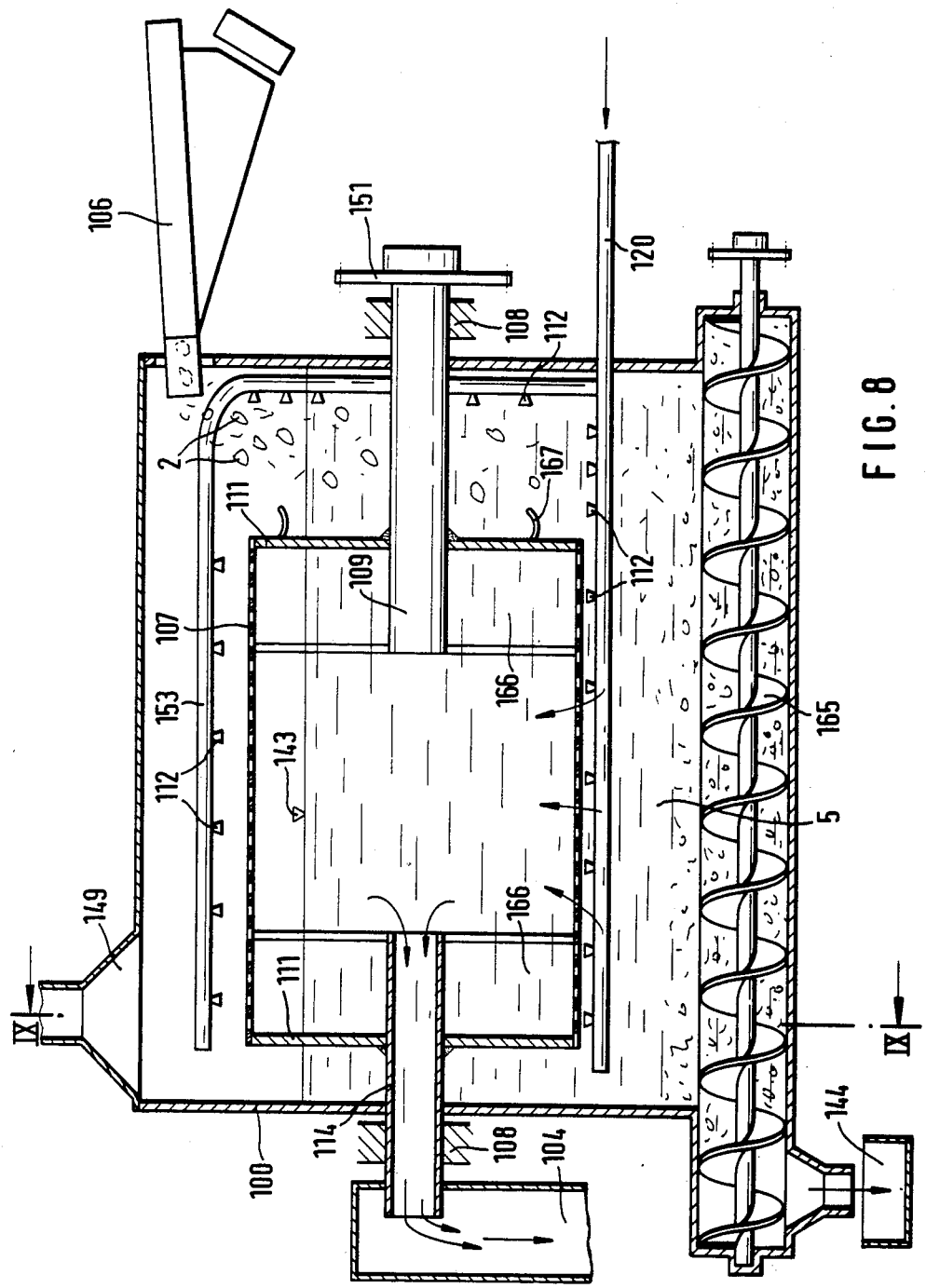
FIG. 8 depicts a third embodiment of the invention in longitudinal section.
Figure 9:
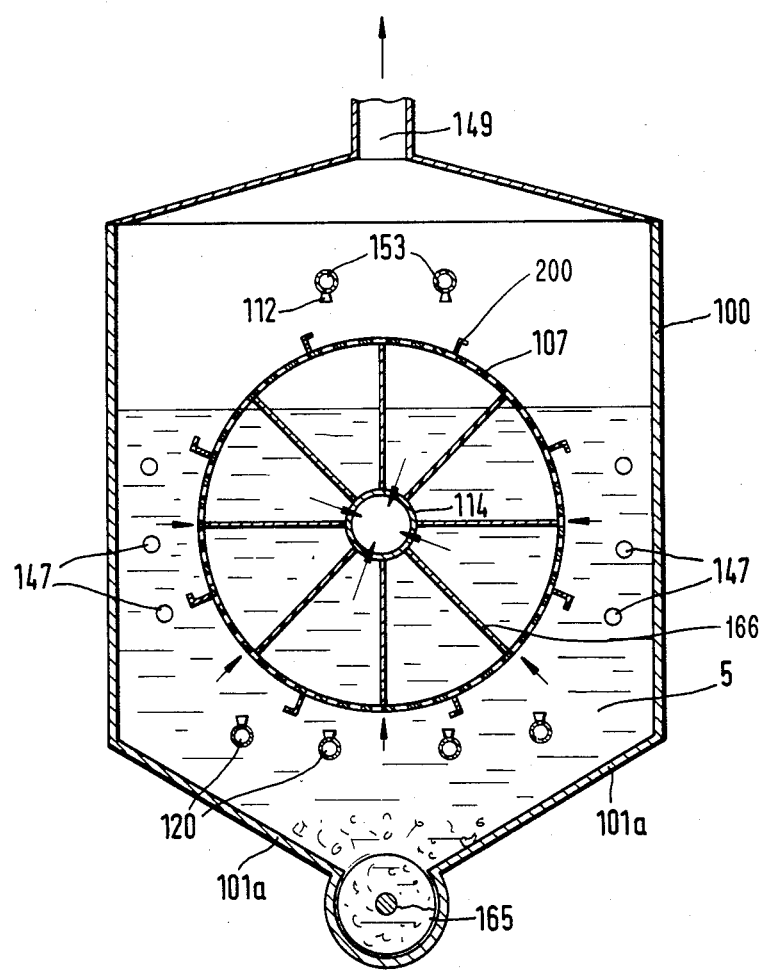
FIG. 9 is a cross-section through FIG. 8 taken along the line IX—IX.

FIGS. 8 and 9 show a further modification of the purification installation according to the invention, which may be used in place of the devices of FIGS. 6, 7 or 2. In this embodiment, within a stationary vessel 100 in a manner similar to the embodiment of FIGS. 6 and 7, a screening drum 107 is supported rotatingly on bearings 108 and is driven by a drive 151. The screening drum 107 may be cylindrical or in the form of a polygonal screening drum. The drum comprises closed walls 111 at its two ends, each of which walls carries longitudinally inwardly extending radial agitator blades 166. Additional blades 200 project outwardly from an outer surface of the drum to entrain impurities. The screening drum 107 is permeable. A journal 109 is provided on the right-hand side to support the drum 107. Support on the left side is furnished by a pipe 114, which in contrast to the embodiment of FIGS. 6 and 7, constitutes an overflow from inside the vessel 100. The vessel is enclosed and provided with an exhaust 149 for the gases being generated. The contaminated sulfur is introduced by means of a feed line 106 and drops into the vessel 100 outside of the screen drum 107. The pieces of sulfur 2 drop into a sulfur bath that may be present up to approximately the level mark 143 and are melted by heat transferred from said sulfur bath, as in the other embodiments. The impurities pass into a funnel-shaped bottom, where they slide down along inclined bottom walls 101a into a discharge conveyor screw 165, from where they are transported into a collector vessel 144 or the like.

Liquid sulfur is introduced at about 145° C. by means of the feed line 120 and sprayed by nozzles in the upward direction onto the rotating screening drum 107. Feed pipes 153 are provided above the screening drum 107 for spraying liquid sulfur, which feed pipes branch upwardly from the feed line 120. The feed pipes 153 contain nozzles 112 arranged on the section of feed pipe 153 which branches upwards and on the section extending approximately parallel to the jacket of the screening drum 107. The nozzles 112 are directed toward the drum 107, whereby heated liquid sulfur may be directed into the direction of the screening drum or the sulfur pieces 2 dropping into the bath and being immersed therein. The purified sulfur is conducted from inside the screening drum 107 through the pipe 114 into the line 104. The pipe 114 thus constitutes the overflow from the vessel 100.

In addition to the agitator blades 166, the screening drum 107 is equipped on its inlet side with further agitator blades 167, which entrain impurities and assure an adequate circulation of the sulfur bath in the zone of the sinking and melting sulfur pieces 2, in order to improve the transfer of heat. The blades 167 thus support the action of the spray nozzles 112 which are also directed into said zone. Similar blades 167 could be provided on the outlet side of the drum, if desired.

The novel process may be carried out with installations other than those described above. It is conceivable for example, to provide in place of the rotating screening drum a revolving conveyor belt immersed into a sulfur bath. An important feature in all cases involves the fact that the melting heat for the sulfur pieces is provided by a sulfur bath heated to an appropriate temperature, from which the swimming or sinking impurities are removed by mechanical means, prior to the transfer of the liquid sulfur to the filter devices from the overflow. This novel combination presents the advantage that no heating devices are required in the zone occupied by contaminated sulfur pieces. No interference with heating devices and the heat transfer process is therefore to be expected.

Although the present invention has been described in connection with a preferred embodiment thereof, it will be appreciated by those skilled in the art that additions, deletions, substitutions and modifications not specifically described may be made without departing from the spirit or scope of the invention as defined in the appended claims.

What we claim is:

1. Apparatus for purifying contaminated sulfur, comprising:

a first source of heated purified liquid sulfur, a non-pressurized vessel communicating with said first source such that said vessel receives heated liquid sulfur from said first source, said vessel including a compartment for receiving and forming a bath of heated liquid sulfur, said vessel including an inlet for receiving pieces of contaminated solid sulfur, and liquid overflow outlet means disposed at a level above a bottom of said compartment over which excess purified liquid sulfur flows from said vessel, a second source of contaminated solid sulfur, conveying means for introducing pieces of contaminated solid sulfur from said second source into said vessel through said inlet at an elevation disposed above said outlet and discharging sulfur pieces directly into a bath of heated liquid sulfur, whereupon sulfur pieces melt to separate impurities from sulfur, and a movable element means disposed within said vessel and extending to a level below said outlet and into a bath of heated liquid sulfur for agitating a bath of heated liquid sulfur and entraining impurities, said first source including means for recycling a part of said purified liquid sulfur emitted from said compartment through said outlet.

2. Apparatus according to claim 1, wherein said recycling means includes filter means for filtering said part of said purified liquid sulfur, and storage tank means for temporarily storing said purified liquid sulfur.

3. Apparatus according to claim 1, wherein said vessel is stationary, said movable element means comprising a rotating screen drum disposed inside of said vessel, a portion of said drum being disposed at an elevation below said outlet so as to be immersed in a bath of heated liquid sulfur.

4. Apparatus according to claim 3 further comprising spraying means for spraying heated liquid sulfur, said spraying means arranged outside of said drum at an upper circumferential portion thereof and directed to spray heated liquid sulfur downwardly into said drum.

5. Apparatus according to claim 3, wherein said conveying means introduces pieces of contaminated solid sulfur into a bath of heated liquid sulfur externally of said drum, said liquid discharge originating at one end of said drum.

6. Apparatus according to claim 5, wherein said overflow outlet means further comprises an overflow pipe extending coaxially from said drum, and rotary bearing means in which said pipe is disposed for rotatably supporting said drum.

7. Apparatus according to claim 3 further comprising a conveyor screw disposed along a bottom of said vessel for removing impurities which have gravitated to said bottom.

8. Apparatus according to claim 7, wherein a lower portion of said vessel converges downwardly in funnel-like fashion to guide impurities to said conveyor screw, said conveyor screw extending generally parallel to said axis of rotation of said drum.

9. Apparatus according to claim 3, wherein said conveying means further comprises an outlet communicating with the interior of said drum to introduce pieces of contaminated solid sulfur into said drum.

10. Apparatus according to claim 9, wherein said drum further comprises opposing ends each containing a radially extending closure ring defining a central opening, a rotary axis of said rum passing through said openings.

11. Apparatus according to claim 10, wherein said conveying means further comprises a chute extending into one of said openings.

12. Apparatus for purifying contaminated sulfur comprising:

a first source of heated purified liquid sulfur, a non-pressured vessel in communication with said first source such that said vessel receives heated liquid sulfur from said first source, said vessel including a rotatable drum defining a compartment for receiving and forming a bath of heated liquid sulfur, said drum including an inlet for introducing pieces of contaminated solid sulfur into said component, said drum defining liquid overflow outlet means disposed at a level above a bottom of said compartment over which excess purified liquid sulfur flows from said drum, a second source of contaminated solid sulfur, conveying means for introducing pieces of contaminated solid sulfur from said second source into said drum through said inlet at an elevation disposed above said outlet and discharging sulfur pieces directly into a bath of heated liquid sulfur, whereupon sulfur pieces melt to separate impurities from sulfur, and element means disposed on an inner surface of said vessel and extending to a level below said outlet and into a bath of heated liquid sulfur for agitating a bath of heated liquid sulfur and entraining impurities as said drum rotates, said first source including means for recycling a part of said purified liquid sulfur emitted from said compartment through said outlet.

13. Apparatus according to claim 12, wherein said element means comprises a plurality of inwardly projecting blades for conveying impurities.

14. Apparatus according to claim 13, wherein said drum further comprises means defining openings at both ends of said drum, said axis passing coaxially through said openings.

15. Apparatus according to claim 14, wherein said conveying means extends through one of said openings, a discharge chute extending through the other opening and arranged to receive impurities falling thereon from said blades.

16. Apparatus according to claim 14, wherein said axis is angled downwardly from said one opening to said other opening, a lower circumferential portion of said other opening defines an overflow edge over which excess liquid sulfur in a bath of heated liquid sulfur is discharged, said overflow edge defining said liquid discharge.

17. Apparatus according to claim 16 further comprising a conduit extending into said one opening for delivering heated liquid sulfur to a bath of heated liquid sulfur from said first source.

18. Apparatus according to claim 17, wherein said conduit further comprising spaced outlets defining said outlet means for discharging heated liquid sulfur.

19. Apparatus according to claim 18, wherein said conduit further comprises a portion extending downwardly from said one opening toward a bottom of said drum, said portion including spray nozzles for spraying heated liquid sulfur, said conveying means arranged to drop contaminated solid sulfur pieces through sulfur sprayed from said nozzles.

20. Apparatus according to claim 19, wherein said conveying means further comprises a chute.

* * * * *